United States Patent [19]

Leach et al.

[11] Patent Number: 5,097,382

[45] Date of Patent: Mar. 17, 1992

[54] CIRCUIT DEVICE RACKING MECHANISM

[75] Inventors: Thomas C. Leach, Cedar Rapids; Marvin L. Linder, Hiawatha; Donald H. Haase, Cedar Rapids, all of Iowa

[73] Assignee: Square D Company, Palatine, Ill.

[21] Appl. No.: 661,024

[22] Filed: Feb. 25, 1991

[51] Int. Cl.[5] ............................................. H02B 1/14
[52] U.S. Cl. ..................................... 361/345; 361/343
[58] Field of Search .................... 200/50 AA, 50 A; 361/336–339, 343, 345

[56] References Cited

U.S. PATENT DOCUMENTS 2,921,998 1/1960 Pokorny et al. .................... 361/337

Primary Examiner—Gregory D. Thompson
Attorney, Agent, or Firm—Jose W. Jimenez; Nicholas A. Camasto

[57] ABSTRACT

A racking mechanism for a fused circuit breaker includes a drive assembly that is removable as a unit from the breaker and fuse truck. A modular drive assembly includes a drive unit having a drive shaft and a travelling nut and yoke for rotating a pair of levering arms for moving the breaker among a plurality of positions in a cubicle. All interlocks are included on the modular drive assembly. An indicator is cam operated by the travelling nut and includes a face having indicia that identifies the direction of rotation of the drive shaft.

16 Claims, 9 Drawing Sheets

CIRCUIT DEVICE RACKING MECHANISM

CROSS-REFERENCE TO RELATED APPLICATIONS

This application is related to application Ser. No. 07/661,567, entitled TORQUE LIMITED DRAWOUT MECHANISM FOR CIRCUIT DEVICE, and application Ser. No. 07/661,032, entitled CHARGING SYSTEM FOR A CIRCUIT BREAKER, all filed on the same date and all assigned to Square D Company.

BACKGROUND OF THE INVENTION

This invention relates generally to racking mechanisms for electrical power equipment and specifically to a racking mechanism that is easier to manufacture, more reliable in operation and that lends itself to modularization.

In the electrical power distribution field, low voltage circuit breakers, fuse trucks and fused circuit breakers are quite large and are usually mounted on a frame with rollers. They generally require mechanical means, such as levering devices, to engage their primary and secondary contacts with electrical power conductors. The breaker may be separate or fused, i.e. mounted on a fuse truck that includes high current fuses. The breakers, fuse trucks and fused circuit breakers are usually housed in protective cubicles, at the rear of which the high current, low voltage power conductors may be accessed. Since circuit breakers and fuse trucks are heavy, they include rollers for enabling them to be moved among various positions, such as Connect, Test, Disconnect and Remove positions, to permit operation, removal, change of fuses, servicing, testing, etc. The cubicle may include a pair of upstanding cradle arms that define slots that are engaged by levering arms that are attached to the racking mechanism. The levering arms engage the slots in the cradle arms, and rotation thereof causes the circuit breaker, fuse truck, of fused circuit breaker (herein sometimes collectively referred to hereinafter as "circuit device") to be rolled into engagement with the electrical power conductors in the cubicle. All the above is very well known in the art and equipment is available from a number of manufacturers. For example, the Square D Company produces a line of DS type circuit breakers which operate in accordance with the above description. While the circuit device racking mechanism presently available performs well, it is unnecessarily costly and may include many separate parts that are disposed about the circuit device for performing the various interlock functions to assure safe operation, removal and testing. It is also difficult to replace fuses in the above-mentioned fuse trucks and fused circuit breakers. The prior art systems of circuit device installation, removal and testing also do not lend themselves to modularization and the manufacturing and operating efficiencies that are obtainable therefrom.

The above noted deficiencies in circuit devices of the prior art are remedied with the present invention. For example, the normal worm gear drive in the levering mechanism used to move the circuit device among the various positions in the cubicle is expensive and requires high torque levels. With the invention, a very simple drive incorporating a travelling nut and a drive shaft with a conventional acme thread is used with a yoke arrangement for rotating the lever arms to move the circuit device among its positions in the cubicle.

Another improvement over prior art circuit device racking mechanisms is in the indicating mechanism that provides a visual signal to the operator of the device position in the cubicle. With present systems, it is often difficult to determine precisely which of the Connect, Test, Disconnect or Remove positions the device is in and the direction of movement required of the drive nut (with a suitable tool) to bring the device into the desired position. Further, in many prior art circuit device racking mechanisms, the indicating mechanism is a pointer that can easily be bent or can snag an operator's clothing. In accordance with another aspect of the present invention, a position indicator is provided that avoids the problems associated with pointers and which, due to its particular background configuration, enables an operator to rapidly and positively identify the direction of circuit device movement when the drive nut is turned.

In the Square D breaker mentioned above, a shutter arrangement is used to prevent access to the drive mechanism (via a suitable drive tool) unless the breaker is tripped. The shutter is spring biased to a closed position covering the drive nut and is mechanically movable to an open position in which the drive nut is accessible. The prior art shutter (and trip plate and padlock mechanisms) have various interlocks to guard against accidents in installing, removing, testing and servicing of the breaker. The interlocks are located on different portions of the breaker and are not conducive to simplified low cost manufacture and assembly. The invention uses a modular drive and levering arrangement, with the shutter, trip plate and padlocking mechanisms providing the prior art interlocks in a very simple and compact arrangement with a minimal number of parts. Accordingly, the arrangement is not only simpler and more ecomonical than the prior art but is more reliable.

The arrangement of the invention is also modular in that the entire racking mechanism may be readily removed, as a unit, from the circuit device to facilitate servicing of the unit and the changing of fuses, if needed.

OBJECTS OF THE INVENTION

A principal object of the invention is to provide an improved circuit device racking mechanism.

Another object of the invention is to provide a circuit device racking mechanism that is cost effective and simpler to manufacture than those of the prior art.

A further object of the invention is to provide a modular racking mechanism for a low voltage circuit breaker.

Still another object of the invention is to provide an improved indicator for a racking mechanism.

An additional object of the invention is to provide a modular racking mechanism for a low voltage fuse truck that facilitates fuse replacement.

A still further object of the invention is to provide a circuit device racking mechanism that requires less drive torque than prior art systems.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
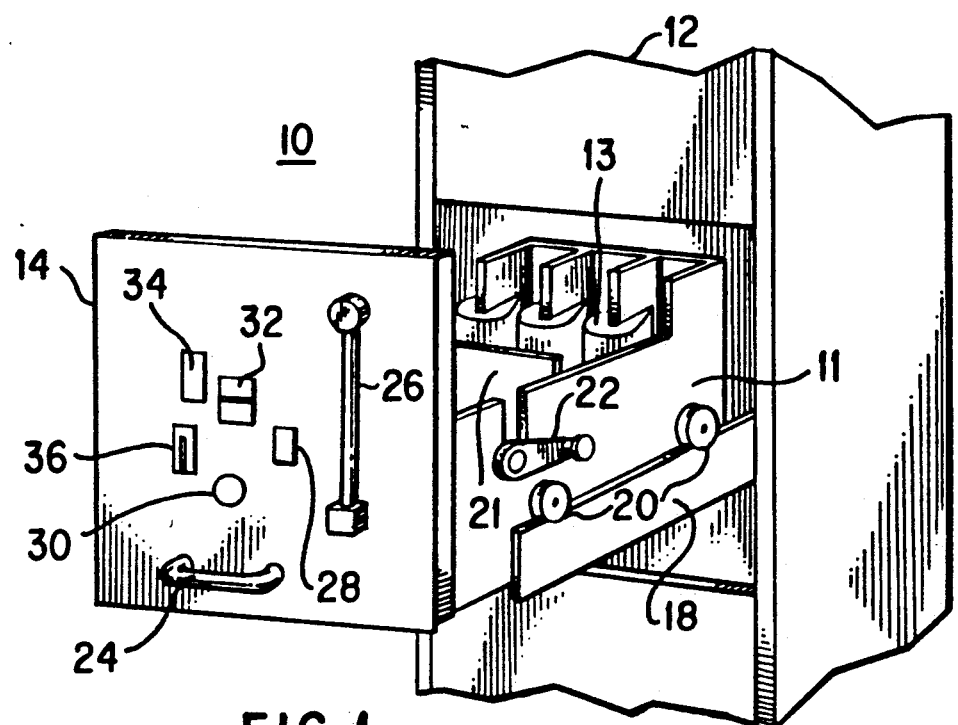
FIG. 1 is a partial perspective drawing of a fused circuit breaker of the invention withdrawn from its cubicle.

Referring to FIG. 1, a fused circuit breaker 10 includes a fuse truck 11 that is shown withdrawn from a cubicle 12 that includes a plurality of high current, low voltage power conductors (not shown) for connection with suitable primary and secondary contacts on the rear of breaker 10. A plurality of fuses 13 are carried by fused circuit breaker 10. As is well known, the breaker primary contacts carry the load currents, whereas the breaker secondary contacts supply control circuits. In the Connect position, the breaker primary and secondary contacts are energized, whereas in the Test position, the primary contacts are disconnected, but the secondary contacts continue to supply power to the breaker control circuits. In the Disconnect position, both the primary and secondary contacts of the breaker are de-energized. In the Remove position, the breaker may be rolled out of the cubicle. Fused circuit breaker 10 has a front panel 14 that is attached to fuse truck 11, which is supported for movement along a pair of rails 18 (only one of which is shown) that telescopically extend from cubicle 12. A pair of rollers 20 on each side of fuse truck 11 ride along rails 18 and carry breaker 10 therewith. A levering arm 22 extends from each side of fused circuit breaker 10. As will be seen the levering arms engage in suitable slots in cradle arms within cubicle 12 for masking fused circuit breaker 10 to be moved among its various positions. A handle 24 on the front panel of the breaker facilitates movement of the breaker along rails 18. A mechanical charging handle 26 is pivotally mounted on the front of the breaker. Charging handle 26 is used to load or charge the heavy duty breaker contact springs (not shown) in the event no electrical charging mechanism is provided or, if provided, is inoperable. A window 28 in breaker panel 14 indicates whether the breaker contacts are opened or closed. A trip plate 30 is operable through an aperture in breaker panel 14 and enables an operator to physically trip the circuit breaker which opens the load circuit. The breaker remains connected to the power conductors, however. A shutter plate 32 is accessible at the front of the panel 14 for purposes to be described. Similarly, an opening is provided in panel 14 to permit viewing of an indicator blade 34 that carries indicia that informs the operator of the position that breaker 10 occupies, that is whether it is in the Connect, Test, Disconnect or Remove positions. Finally, a padlock plate 36 is provided, which when physically pulled out, enables use of a conventional padlock to lock the breaker into a selected one of its positions. This prevents unauthorized or inadvertent operation or tampering with the breaker. As will be seen below, a support plate 21 extends across fuse truck 11 and supports, for easy removal, the racking mechanism.

Figure 1A:
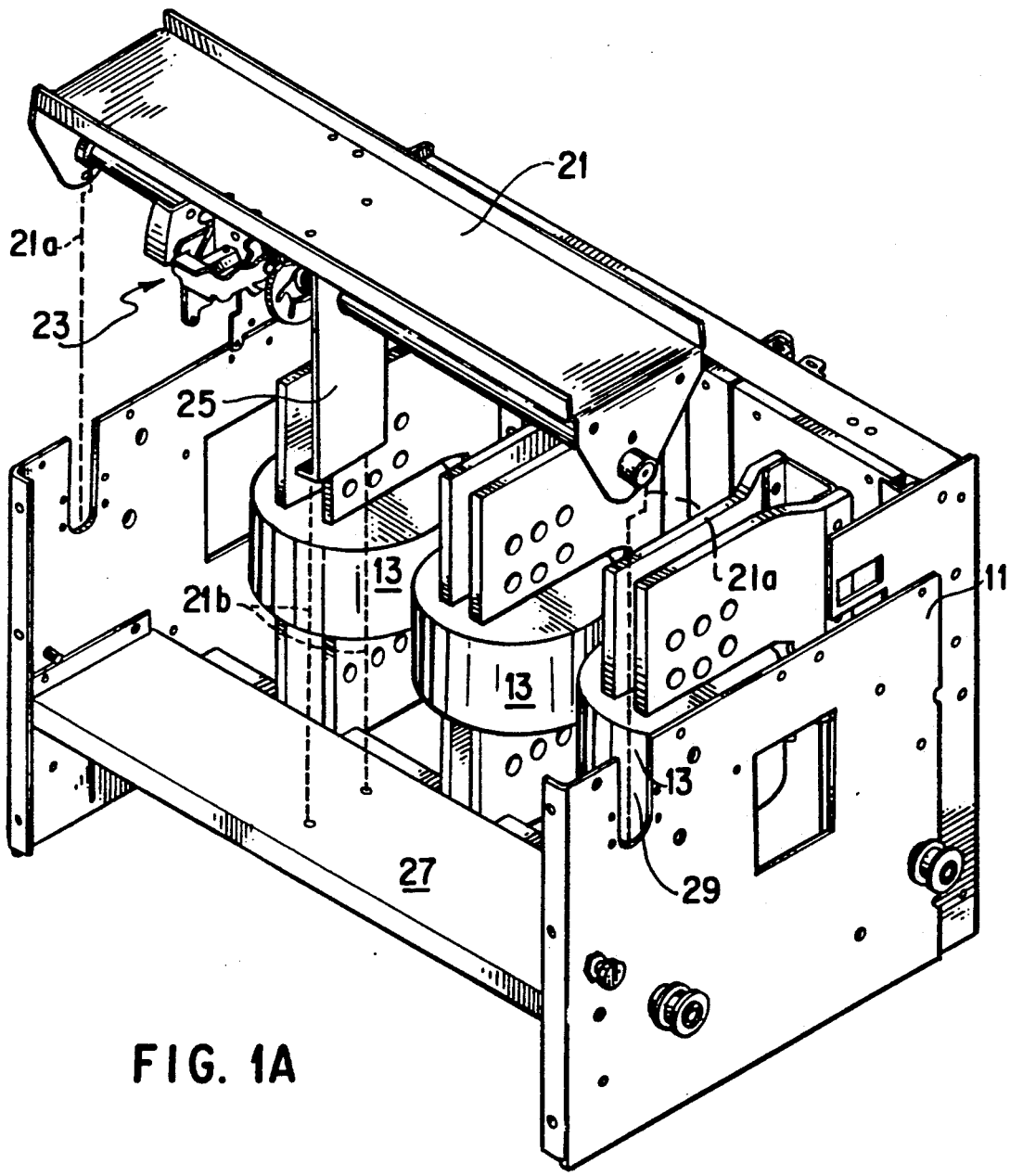
FIG. 1A is a partial exploded perspective drawing of a fuse truck illustrating the modularity of the racking mechanism.

FIG. 1A illustrates the modularity of the racking mechanism 23, generally identified by reference numeral 23. The racking mechanism 23 is supported by support plate 21 that is bolted to the side plates of fuse truck 11. As indicated by the dashed lines 21a, support plate 21 (and racking mechanism 23) is shown removed from the side plates of the fuse truck 11. A support leg 25 is also bolted to a crosspiece 27 on the fuse truck 11 as indicated by the dashed lines 21b. The U-shaped slots 29 in the side plates of the fuse truck 11 permit ready installation and removal of the racking mechanism 23, which permits easy access to the fuses 13.

Figure 2:
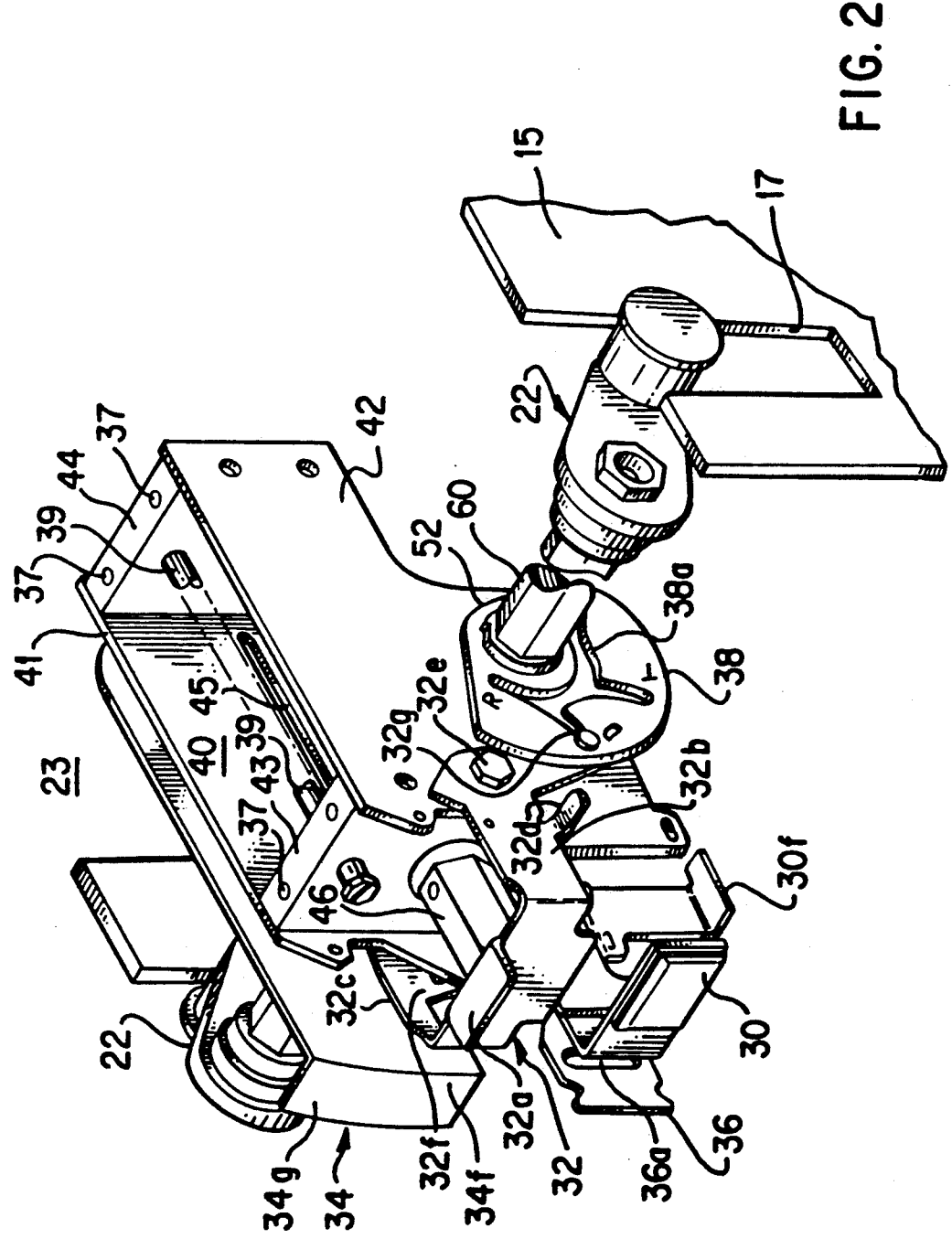
FIG. 2 is a partial perspective view of a modular racking mechanism constructed in accordance with the invention.

FIG. 2 illustrates the drive mechanism of the racking mechanism 23 for levering the circuit device among its various positions within the cubicle. A pair of cradle arms 15 are partially illustrated. These cradle arms 15 are rigidly attached to the inside of cubicle 12 (FIG. 1) and define a pair of vertical slots 17 within which camming rollers on the end of lever arms 22 are engageable. As levering arms 22 are rotated in a clockwise direction, the rollers engage the slots 17 of the cradle arms 15 and, since the cradle arms are affixed to the cubicle, further rotation of the levering arms 22 results in movement of the drive mechanism 23 (and the circuit device to which it is attached) into the cubicle. In this way, the circuit device is moved among its four positions above enumerated. This levering technique is well known in the art and does not constitute a part of the present invention. In FIG. 2, trip plate 30, generally U-shaped shutter 32 and an L-shaped indicator blade 34 are illustrated. As will be seen, indicator blade 34 pivots about a rear axis to describe an arcuate movement that varies as a function of the position of a travelling nut in the drive mechanism. The face of indicator blade 34 bears the legends Connect, Test, Disconnect and Remove on a background that enables an operator to readily determine the position of the circuit device and the direction in which it is being moved. Specifically, the face of indicator blade 34 is divided into two triangular portions 34f and 34g that are of different colors. The proportion of the colors visible through the window in front panel 14 changes as the indicator moves and readily informs the operator of the direction of movement.

Shutter 32 includes a right angle lifting tab 32a and a pair of displaced legs 32b and 32c. A tab 32d extends from leg 32b and engages a mechanism (not illustrated) for operating a breaker contacts open/close indicator as discussed in reference to FIG. 1. A generally rectangular drive body 40 includes a pair of side plates 41 and 42 and end plates 43 and 44. A heavy duty bolt 39 secures end plates 43 and 44 together. As generally shown in FIG. 1A, drive body 40 is securely attached to support plate 21 of fuse truck 11 or fused circuit breaker 10 by means of suitable screw fasteners engaging threaded apertures 37 in the end plates. Shutter 32 is mounted for rotational movement on drive body 40 by means of shoulder bolts 32e and includes an interlock tab 32f on leg 32c for purposes to be described. A shutter cam plate 38 includes a generally arcuate cam track 38a rigidly affixed by a positioning device 58 to a levering shaft 60 of hexagonal cross section. Shaft 60 is coupled to levering arms 22 at its opposite ends and positioning device 58 maintains a precise relationship between the shaft 60, the shutter cam plate 38 and the levering arms 22. A cam pin 32g affixed to the end of leg 32b rides in cam track 38a. A horizontal slot 45 is formed in side plate 41 for permitting a cam pin attached to the travelling nut to lift indicator blade 34 as the travelling nut moves. A hexagon shaped drive nut 46 permits rotation of the lever arms 22 by means of a suitable tool. Drive nut 46 is preferably constructed in accordance with the teachings of copending application Ser. No. 07/661,567 to be torque limited so as to prevent over torquing. Interlock tab 30g at the bottom of trip plate 30 is provided to displace a trip latch (not shown) to mechanically trip the circuit breaker to its open condition. Consequently, when the trip plate 30 is pushed inwardly, the circuit breaker is tripped open. Padlock plate 36 is slidably mounted on body 40 and includes a slot 36a through which the shackle of a conventional padlock may be inserted for locking the breaker in a given position and precluding access to drive nut 46. As will be seen, padlock plate 36 is interlocked with shutter 32 and trip plate 30.

Figure 3:
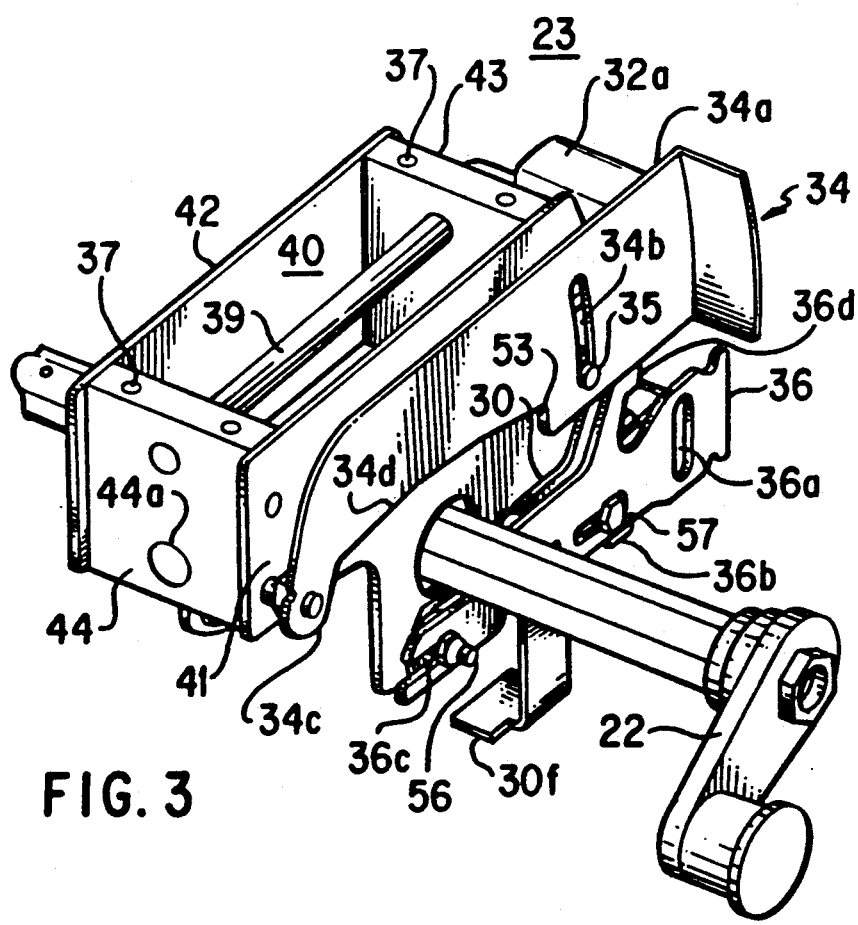
FIG. 3 is a rear view of the mechanism of FIG. 2.

In the rear view of FIG. 3, padlock plate 36 is seen to include an upstanding interlock portion 36c and a pair of displaced horizontal slots 36b and 36c. A pin assembly 56 and a pin 57 loosely secure padlock plate 36 (and trip plate 30) to side plate 41 and permit limited translational movement of padlock plate 36 by virtue of slots 36b and 36c. A cam pin 53 engages a cam surface 34c formed by the lower edge of indicator blade 34. Indicator blade 34 also includes an arcuate slot 34b that engages a guide pin 35 that is affixed to side plate 41 for confining the arcuate movement of indicator blade 34 about a pin arrangement 34c that is also affixed to side plate 41.

Figure 4:
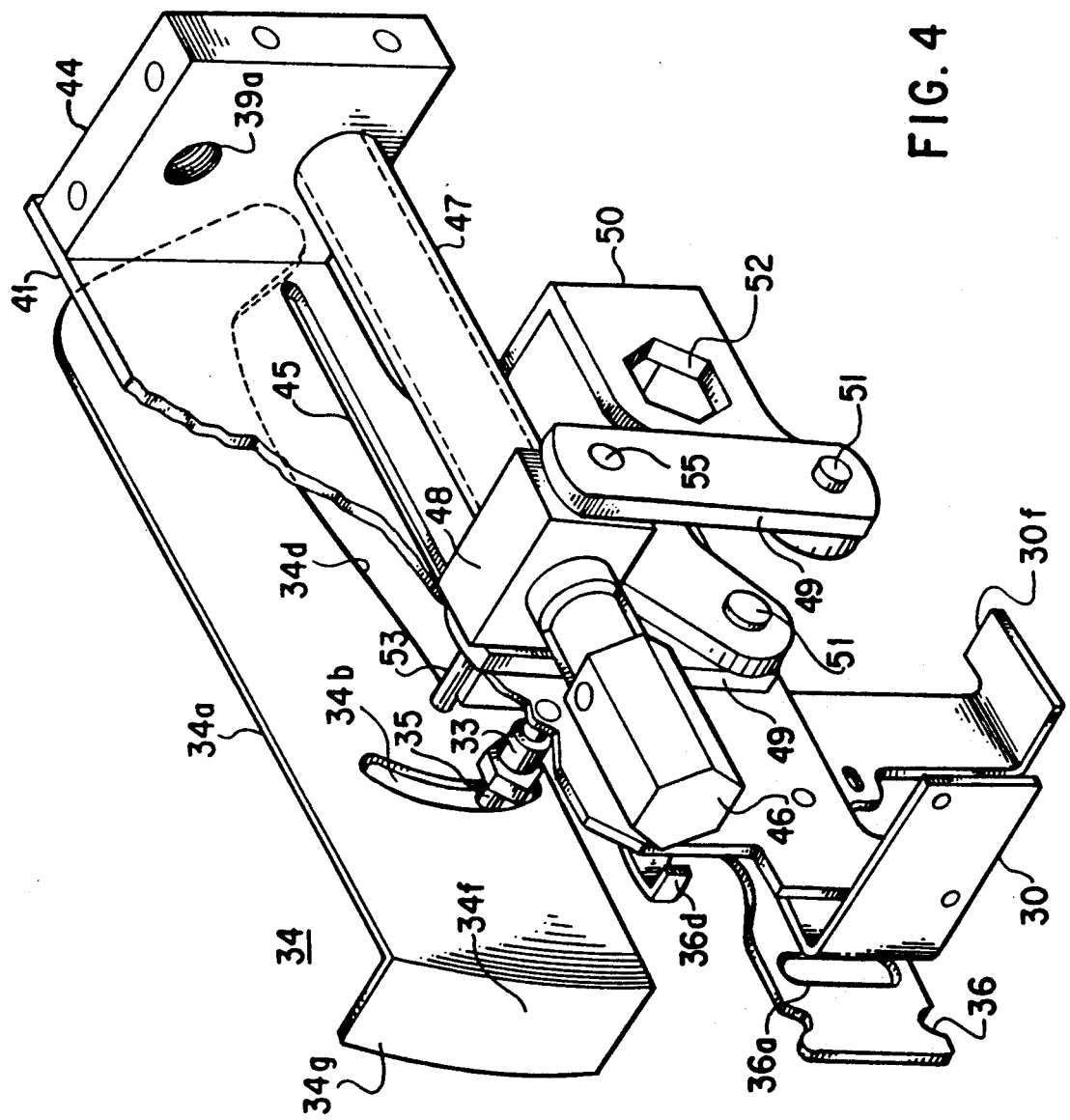
FIG. 4 is an enlarged cutaway view showing the novel drive mechanism of the invention.

In the enlarged broken away illustration of FIG. 4, the drive mechanism is shown in more detail. Specifically, drive nut 46 is securely attached to a threaded shaft 47 that engages a travelling nut 48. The thread on shaft 47 is preferably a standard acme type. Travelling nut 48 has a complementary thread and is linearly driven along threaded shaft 47 in response to suitable rotation of drive head 46. Travelling nut 48 includes cam pin 53 and another pin 55 which extend transversely therefrom. While not shown, cam pin 53 is a small diameter extension of a pin corresponding to pin 55 upon which a pair of yoke links 49 is rotatably mounted. The arms of a yoke 50 are pivotably mounted to the other ends of links 49 by means of a pair of pins 51. Yoke 50 also includes a pair of aligned hexagonal cutouts in the yoke arms for precise engagement with shaft 60. As should be apparent, rotation of drive nut 46 causes traveling nut 48 to move along threaded shaft 47, causing rotation of yoke 50 about the center axis of hexagonal openings 52. Since shaft 60 is secured in the hexagonal openings 52, levering arms 22 are rotated as shaft 60 is rotated. Rotation of levering arms 22 with respect to cradle arms 15 translates the drive mechanism and attached circuit device into or out of the cubicle.

Figure 5:
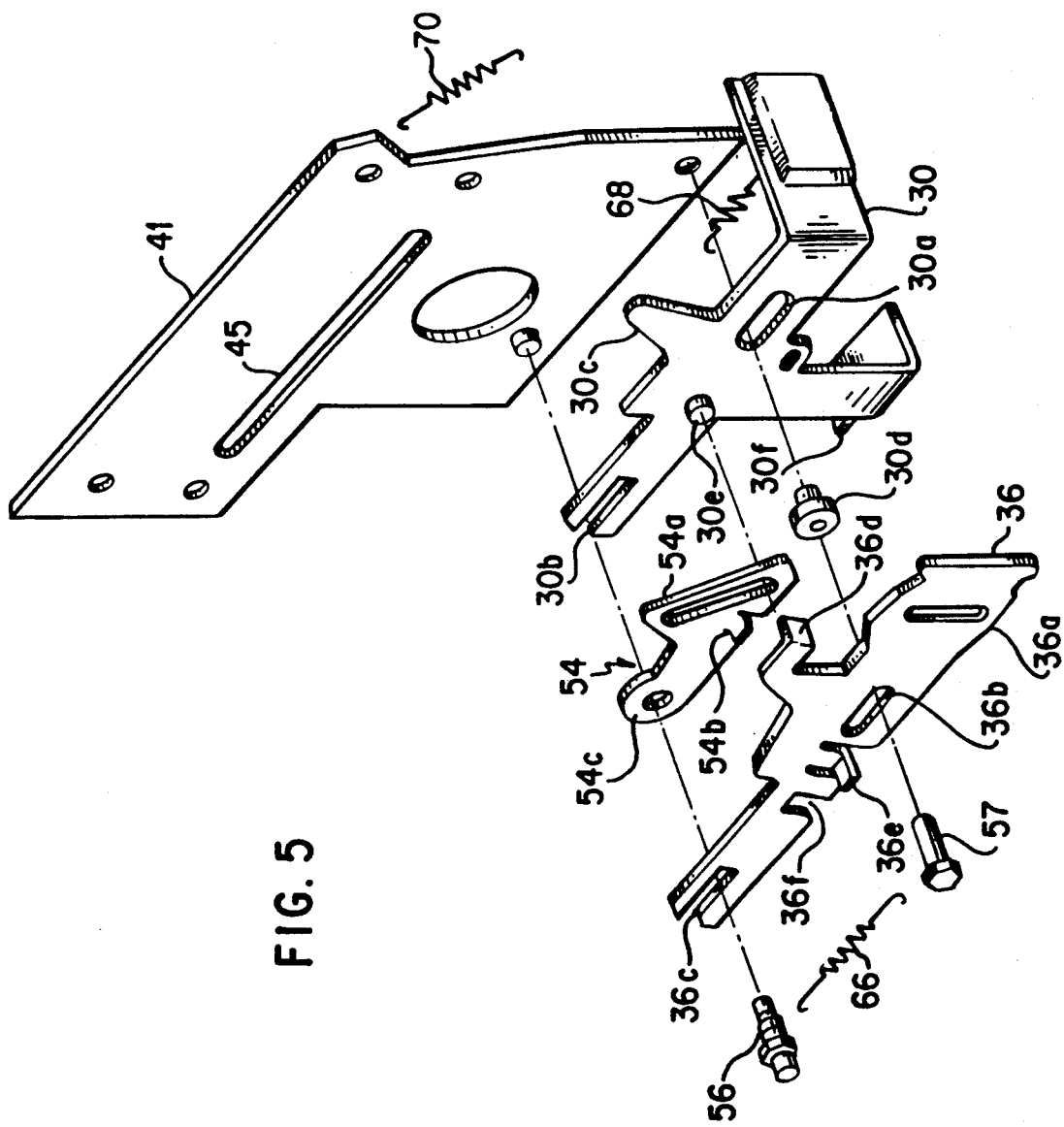
FIG. 5 is a partial exploded view of certain elements of the inventive mechanism.

FIG. 5 shows side plate 41 and some of the parts that are attached thereto, omitting for purposes of clarity indicator blade 34 and shutter 32. Trip plate 30 comprises a generally T-shaped body having a pair of aligned horizontal slots 30a and 30b and trip lever operating tab 30f and interlock tab 30c. A suitable roller or guide 30e is attached to the side of trip padlock 30 and engages a padlock plate interlock 54 that includes an angularly disposed rectangular slot 54a for engaging pin 30e on trip plate 30. An outwardly bent tab 54b on padlock interlock 54 engages a slot 36f in padlock plate 36. A spring 66 couples pin assembly 56 to an outwardly bent tang 36e on the side of padlock plate 36 for normally biasing the padlock plate 36 in the retracted position (towards the rear of the breaker). As mentioned, pin assembly 56 and pin 57 secure padlock plate 37, padlock interlock 54 and trip plate 30 to side plate 41. A guide roller 30d is configured to provide proper spacing between the various elements and to permit linear motion of padlock plate 36.

Figure 6A:
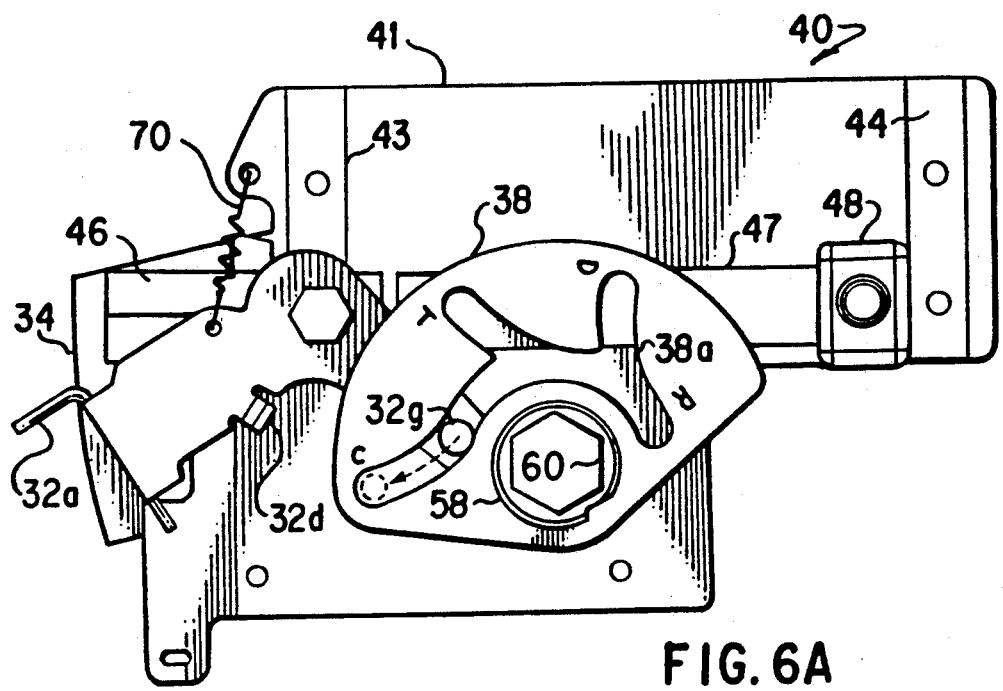
FIGS. 6A and 6B are respective right and left side partially cutaway views illustrating the mechanism of the invention in the Connect position.
Figure 6B:
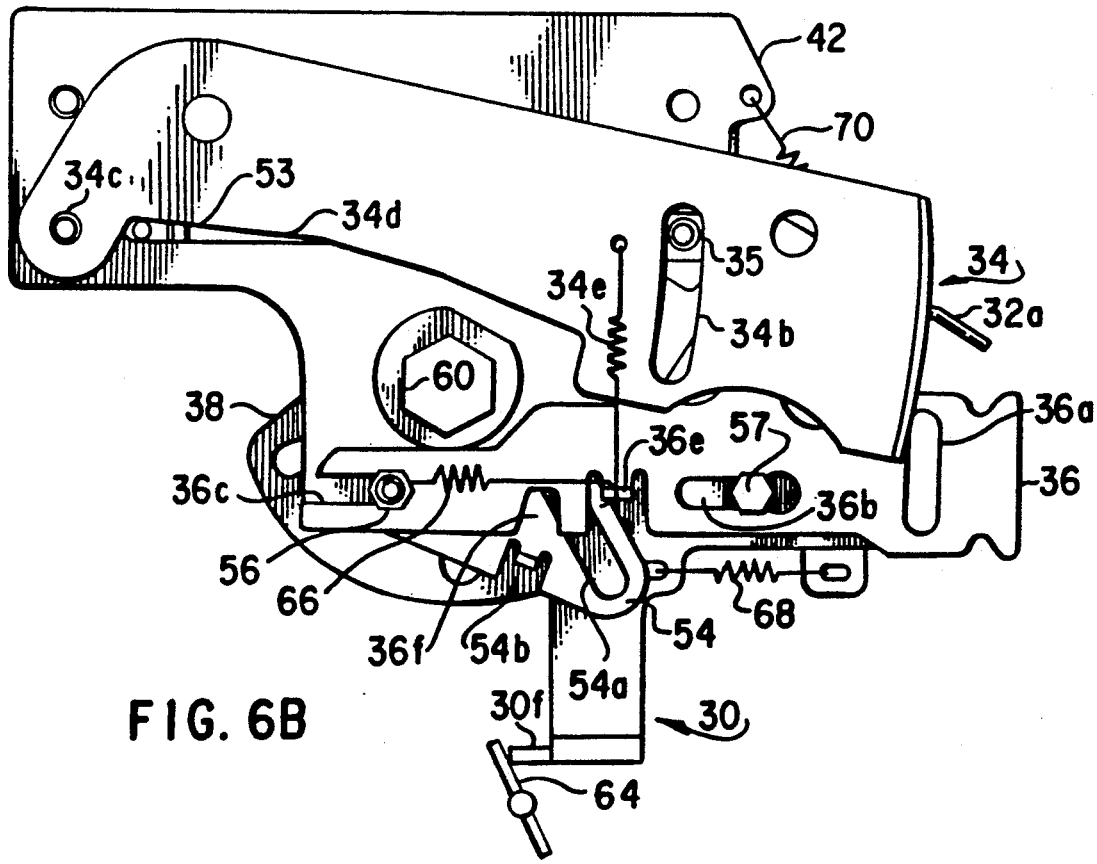

The figure sets 6A-6B, 7A-7B, 8A-8B and 9A-9B illustrate partially broken away views of left and right sides of the drive assembly with fused circuit breaker 10 in its Connect, Test, Disconnect and Remove positions, respectively. In the connect position shown in FIGS. 6A and 6B, the breaker primary and secondary contacts are in electrical engagement with the power conductors in the cubicle.

The respective side plates and some other elements are removed for clarity. Shutter 32 is biased to its upward (closed) position by a spring 70. Shutter 32 cannot be opened (rotated down) to permit access to drive nut 46 until the breaker is tripped by pushing in trip plate 30. Cam plate 38 is shown in the Connect position with cam pin 32g being movable along the short path extending half the distance between positions C and T. Indicator blade 34 is at its lowest horizontal position corresponding to travelling nut 48 being at the rear of body 40. A spring 34e couples indicator plate 34 and tang 36e on padlock plate 36, which biases the indicator plate towards its lowermost position so that cam surface 34d is always in engagement with cam pin 53. A trip latch 64 is also illustrated in the tripped position by virtue of trip tab 30f on trip plate 30 engaging it. Trip plate 30 is normally biased out (toward the front of body 40) by virtue of a spring 68. Those skilled in the art will appreciate that trip latch 64 is well known and, when deflected by the trip plate, results in tripping of the breaker. It will also be noted that in this position (with trip plate 30 being pushed in), padlock interlock 54 is forced down and disengages tab 54b from slot 36f in padlock plate 36. Therefore the padlock plate can be pulled out (to the right in FIG. 6B) to the extent permitted by slot 36b. The shutter 32 can close because cam pin 32g can move to the C position in cam plate 38. In the Connect position, the breaker is fully functional. Once the shutter closes, the trip plate will move to its normal "out" position due to urging of spring 68, trip latch 64 will reset and padlock interlock 54 will be rotated upwardly to engage tab 54b in a slot 36f to prevent padlock plate 36 from being withdrawn.

Figure 7A:
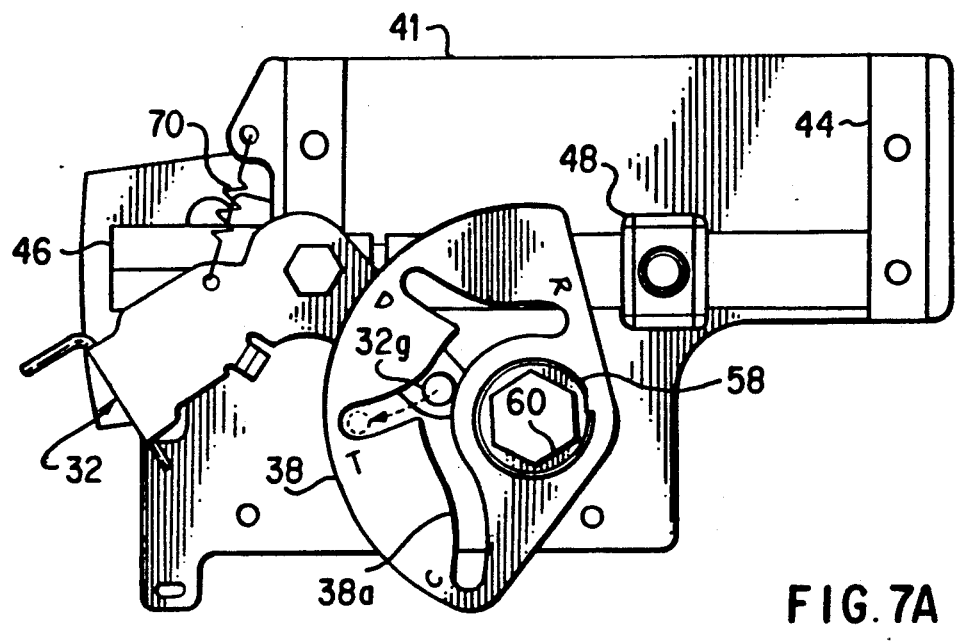
FIGS. 7A and 7B are similar views illustrating the mechanism in the Test position.
Figure 7B:
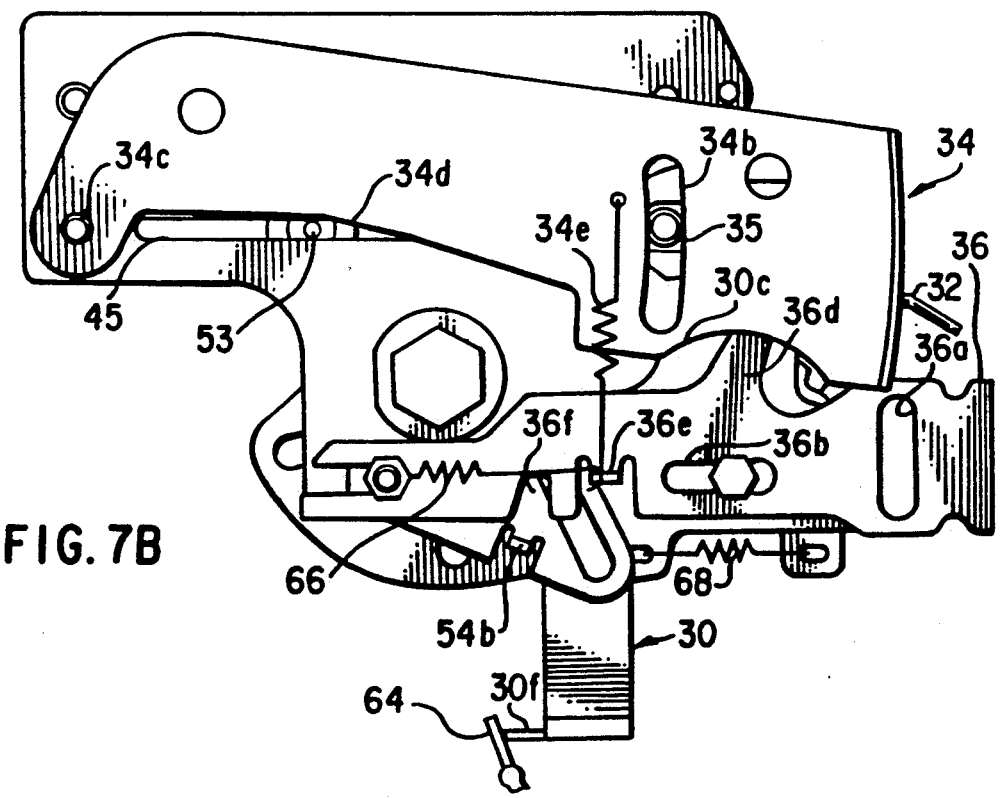

FIGS. 7A and 7B shown the elements in the drive assembly in the breaker Test position, which is just slightly forward of the Connect position; i.e. the breaker is moved sufficiently out of the cubicle to disconnect the primaries to permit testing of the breaker control circuitry. This is possible since the breaker secondaries are not disconnected from the power conductors in the Test position. Cam pin 32g is seen to be movable in cam track 38a along the dotted line path. Shutter 32 is therefore capable of being moved between its open and closed positions permitting access to drive nut 46. (As mentioned above, shutter 32 cannot be opened until trip plate 30 has been pushed in and the breaker tripped.) Travelling nut 48 has moved away from end plate 44 causing cam pin 53 to raise indicator blade 34 as it travels in slot 45. In the Test position, the shutter 32 will rotate up (when the tool for rotating drive nut 46 is removed), the trip plate 30 will spring return out, rotating padlock interlock 54 up to prevent padlock plate 36 from being pulled out and the breaker will be ready for testing.

Figure 8A:
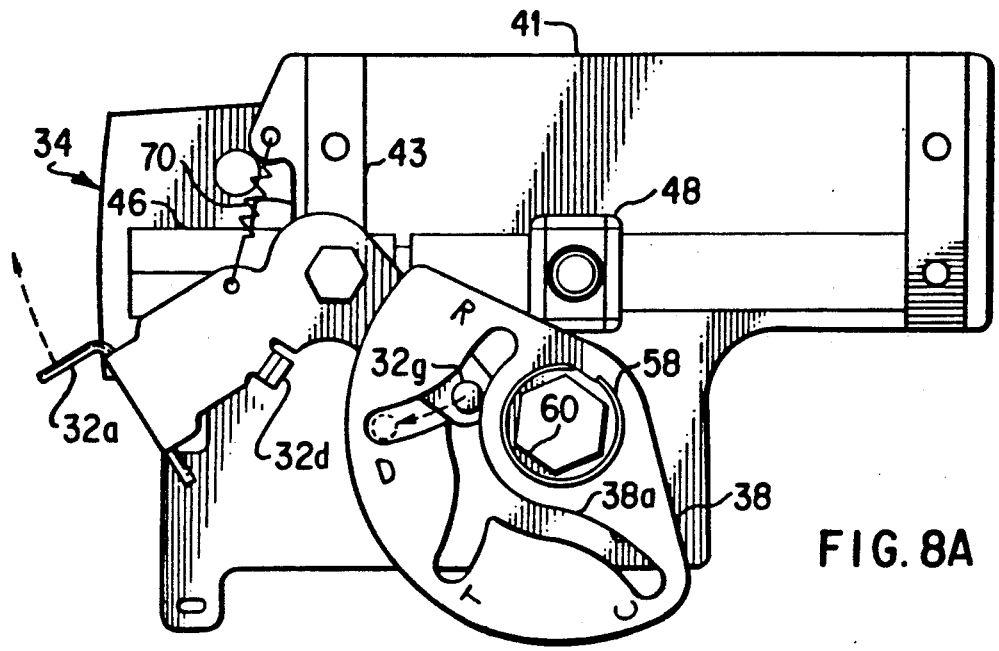
FIGS. 8A and 8B are similar views illustrating the mechanism in the Disconnect position.
Figure 8B:
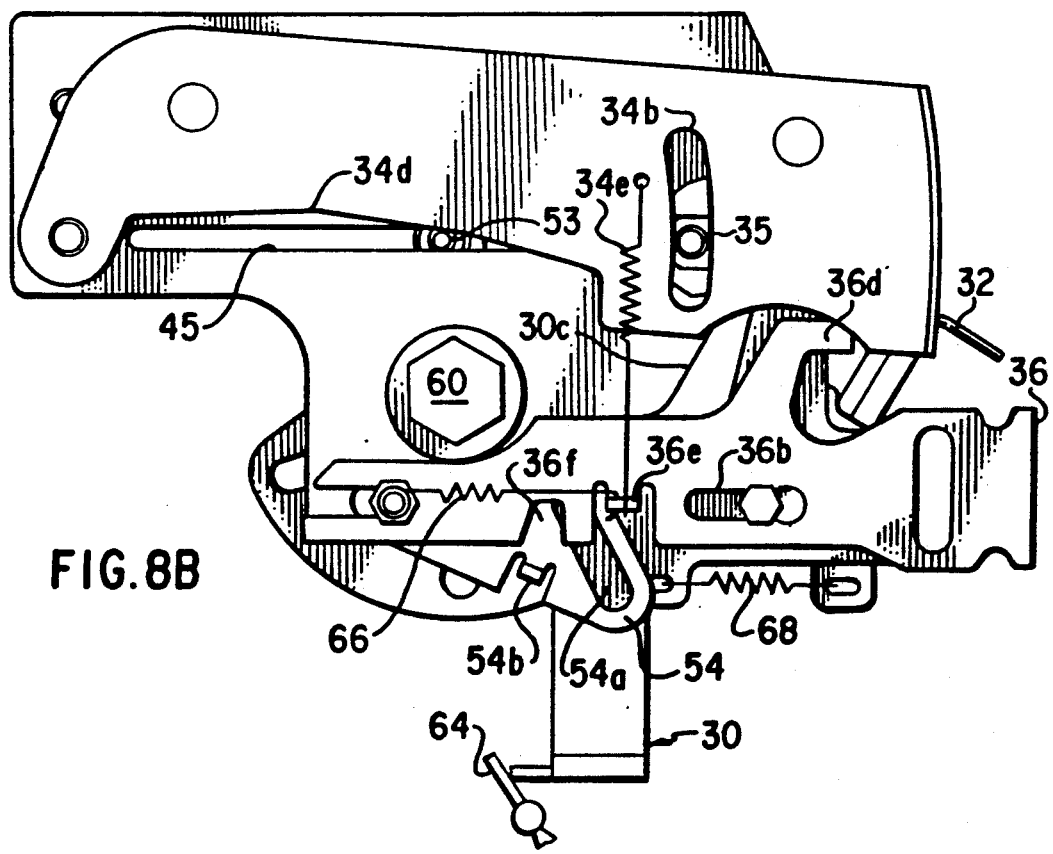

FIGS. 8A and 8B illustrate the drive assembly elements when the breaker is in the Disconnect position, i.e. has been moved far enough out of the cubicle to also physically disengage the breaker secondaries from the power conductors in the cubicle. Cam pin 32g is movable along the portion of cam track 38a illustrated by the dashed line. In the Disconnect position, the breaker is electrically disconnected from the power conductors in the cubicle, but may be operated manually to test tripping. The breaker cannot be removed from the cubicle because the levering arms 22 are still engaging the cradle arms 15 of the cubicle (FIG. 2).

Figure 9A:
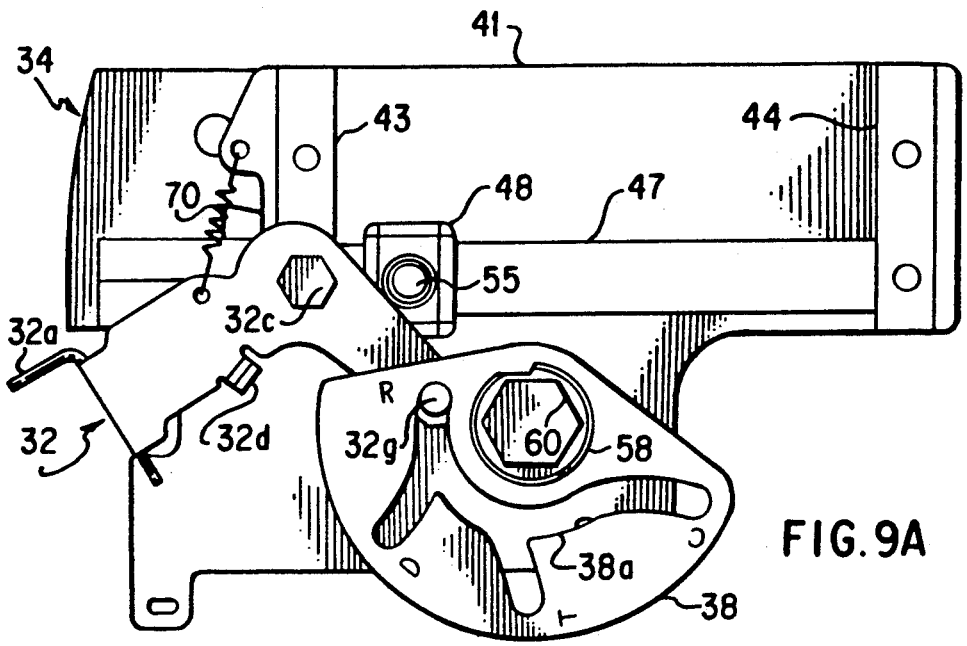
FIGS. 9A and 9B are similar views illustrating the mechanism in the Remove position.
Figure 9B:
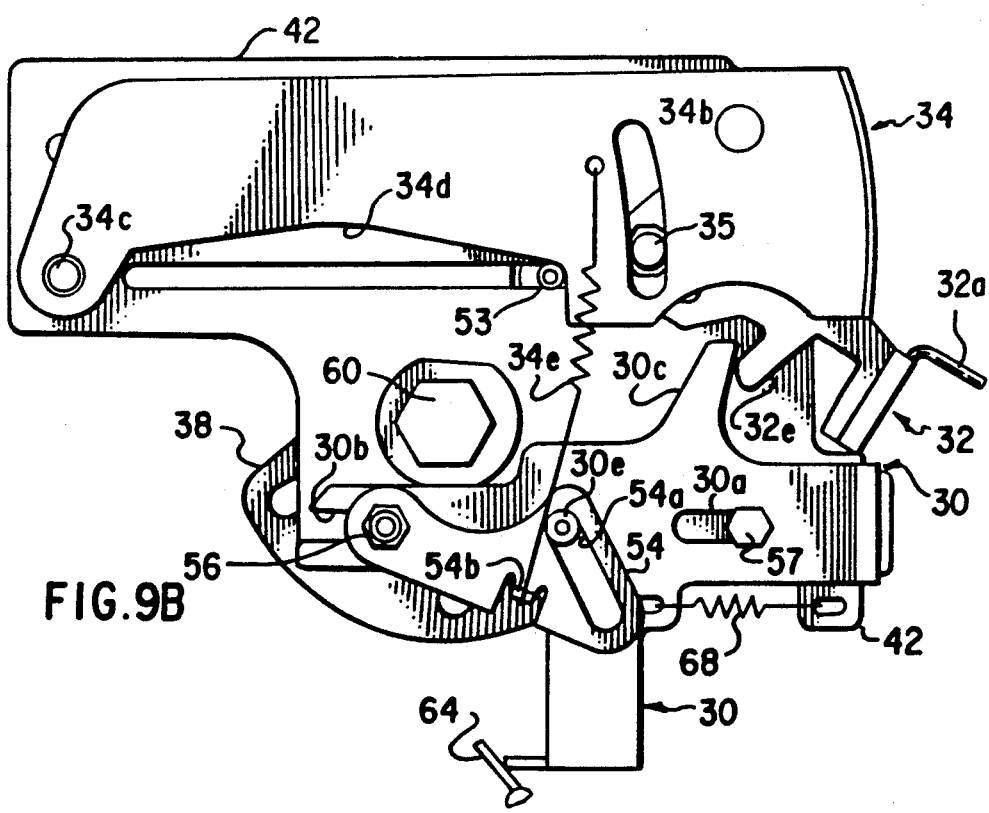

FIGS. 9A and 9B shown the drive assembly in the Removed position where the breaker or circuit device can be rolled out of the cubicle on the rails 18, which telescopically extend, to a position where the breaker may be lifted from the rails for replacement or overhaul. Cam pin 32g is seen to be captured in the R position of cam plate 38 and cannot be closed when the tool used to rotate drive nut 46 is removed. Note that padlock plate 36 is omitted in FIG. 9B for clarity. Interlock tab 30c on trip plate 30 is blocked by interlock tab 32e on shutter 32 and consequently, trip plate 30 cannot return to its normal outward position. Thus, trip latch 64 is held in its tripped position. Padlock interlock 543 is held down by virtue of pin 30e in slot 54a and padlock plate 36 (not shown) cannot be pulled out. The breaker cannot be operated because of the position of trip latch 64.

It should be noted that, in the normal closed position of shutter 32 and normal out position of trip plate 30, the interlock tabs 30c and 32e are in alignment and shutter 32 cannot be opened unless trip plate 30 is pressed in. This is a safety feature to prevent access to drive nut 46 unless the breaker is tripped. A similar function is performed by the interlock tab 36c on padlock plate 36 (see FIG. 8B) which physically blocks shutter 32 from being moved to its open position when the padlock plate 36 is pulled out (and locked). Both these safety interlocks are provided in the prior art, albeit with different, more complex structure.

What is claimed is:

1. In combination with a circuit device having a trip latch, a racking mechanism for moving said circuit device among a plurality of positions in a cubicle having cradle arms comprising:
   levering means on said circuit device for rotationally engaging said cradle arms;
   mechanical drive means rotating said levering means;
   shutter means normally biased to a closed position in which access to said drive means is precluded;
   cam means in engagement with said shutter means enabling movement of said shutter means to an open position in which access to said drive means is permitted in certain of the circuit device positions; and
   interlock means blocking movement of said shutter means to said open position unless said trip latch is actuated, said levering means including a pair of levering arms, said shutter means including a follower pin and said cam means including a cam plate on one of said pair of levering arms, and defining an arcuate path for said follower pin whereby movement of said shutter means between said open position and a closed position is permitted in accordance with the rotation of said levering means.

2. The racking mechanism of claim 1, further including trip plate means actuating said trip latch and defining said interlock means.

3. The racking mechanism of claim 2, further including padlock means interlocked with said trip plate means precluding movement of said shutter means to said open position when said padlock means is activated.

4. The racking mechanism of claim 3 wherein said drive means includes a drive shaft, a travelling nut and yoke means, said yoke means coupling said travelling nut to said levering means.

5. The racking mechanism of claim 4, further including indicator means mechanically actuatable responsive to movement of said travelling nut for yielding a visual indication of said positions.

6. The racking mechanism of claim 5 wherein said indicator means comprises a cam operated lever having a cam surface engaging a cam element coupled to said travelling nut.

7. The racking mechanism of claim 6 wherein said indicator means includes an indicator plate bearing indicia for positively identifying the direction of movement of said circuit device in said cubicle as said drive shaft is rotated.

8. The racking mechanism of claim 7 wherein said indicia comprises a background of two different colored complementary diagonal portions.

9. The racking mechanism of claim 1 wherein said circuit device includes a removable support plate to which said racking mechanism is attached.

10. In combination with a circuit device having a trip latch, a racking mechanism for moving said circuit device among Connect, Test, Disconnect and Remove positions in a cubicle including a pair of cradle arms comprising:
    a pair of lever arms coupled to said circuit device and rotationally engageable with said cradle arms;
    drive means, including a drive shaft, a travelling nut and yoke means, said yoke means coupling said travelling nut and said lever arms and rotating said pair of lever arms responsive to rotation of said drive shaft;
    a movable shutter having a closed position prohibiting access to said drive shaft and an open position permitting access to said drive shaft;
    means biasing said shutter to said closed position;
    a cam plate coupled to one of said pair of lever arms and defining an arcuate path having points corresponding to said Connect, Test, Disconnect and Remove positions;
    a follower pin on said shutter engaged with said arcuate path; and
    a movable trip plate for actuating said trip latch, said trip plate normally biased to block movement of said shutter to said open position.

11. The racking mechanism of claim 10, further including a padlock plate normally biased to a position of non-interference with said shutter and being movable to a locking position preventing movement of said shutter to said open position.

12. The racking mechanism of claim 11, wherein said padlock plate is precluded from movement to said locking position unless said trip plate is moved to actuate said trip latch.

13. The racking mechanism of claim 11, further including an indicator plate, movable in response to movement of said travelling nut, for indicating the position of said circuit device in said cubicle.

14. The racking mechanism of claim 13 wherein said indicator plate includes indicia for positively identifying the direction of movement of said circuit device in said cubicle as said drive shaft is rotated.

15. The racking mechanism of claim 14 wherein said indicia comprises a background of two different colored complementary diagonal portions.

16. The racking mechanism of claim 1 wherein said circuit device includes a removable support plate to which said racking mechanism is attached.

* * * * *